April 25, 1950  J. M. ROLLAND  2,505,007
LATHE DOG

Filed May 3, 1946  3 Sheets-Sheet 1

INVENTOR.
JOHN M. ROLLAND
BY *Victor J. Evans & Co.*
ATTORNEYS

April 25, 1950     J. M. ROLLAND     2,505,007
LATHE DOG

Filed May 3, 1946     3 Sheets-Sheet 2

*INVENTOR.*

JOHN M. ROLLAND

BY *Victor J. Evans & Co.*

ATTORNEYS

April 25, 1950     J. M. ROLLAND     2,505,007
LATHE DOG

Filed May 3, 1946     3 Sheets-Sheet 3

*INVENTOR.*

JOHN M. ROLLAND

BY *Victor J. Evans & Co.*

ATTORNEYS

Patented Apr. 25, 1950

2,505,007

UNITED STATES PATENT OFFICE 2,505,007

LATHE DOG

John M. Rolland, Chicago, Ill.

Application May 3, 1946, Serial No. 667,096

1 Claim. (Cl. 82—40)

The present invention relates to improvements in lathe dogs or work holders of the type employed in rotary metal working machine tools, and including a plurality of radially reciprocable work clamping jaws, and means for projecting and retracting the jaws.

The primary object of the invention is the provision of a unitary appliance of the manually operated type that may with facility be bodily attached to and used with the rotary face plate of a conventional form of lathe upon which the work to be turned has preferably been centered; and equalizing means are provided for adapting the work holding jaws to work that may be slightly off center.

In carrying out my invention, the self-contained dog is equipped with an operating hand-wheel, and means are provided for translating the rotary movement of the hand wheel into radially reciprocable movement of rotary screw bolts, for projecting and retracting the jaws mounted upon the bolts.

By the utilization of my invention in the mechanical structure of the dog the work holding jaws may with convenience be quickly set for use, and with equal facility the jaws may be retracted to release the work after completion of the turning operation, thus saving time and labor, especially in production runs of the lathe with which the dog is employed.

The invention consists in certain novel combinations and arrangements of parts as will hereinafter be more fully set forth and claimed.

In the accompanying drawings I have illustrated one complete example of the physical embodiment of my invention wherein the parts are combined and arranged in accord with one mode I have thus far devised for the practical application of the principles of my invention, but it will be understood that changes and alterations may be made in these exemplifying drawings and mechanical structures within the scope of my claim without departing from the principles of the invention.

Figure 1:
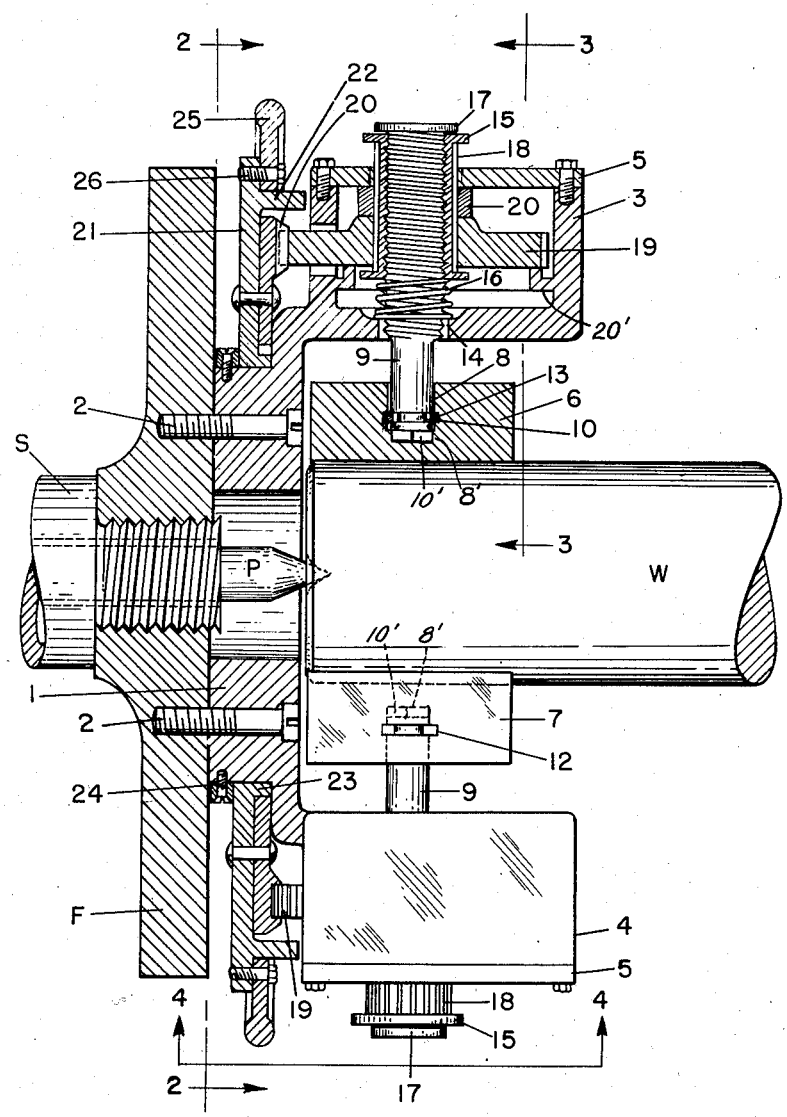
Figure 1 is a vertical longitudinal sectional view through a dog embodying my invention, attached to the face plate of a rotary lathe, and showing the work to be turned by the lathe.
Figure 2:
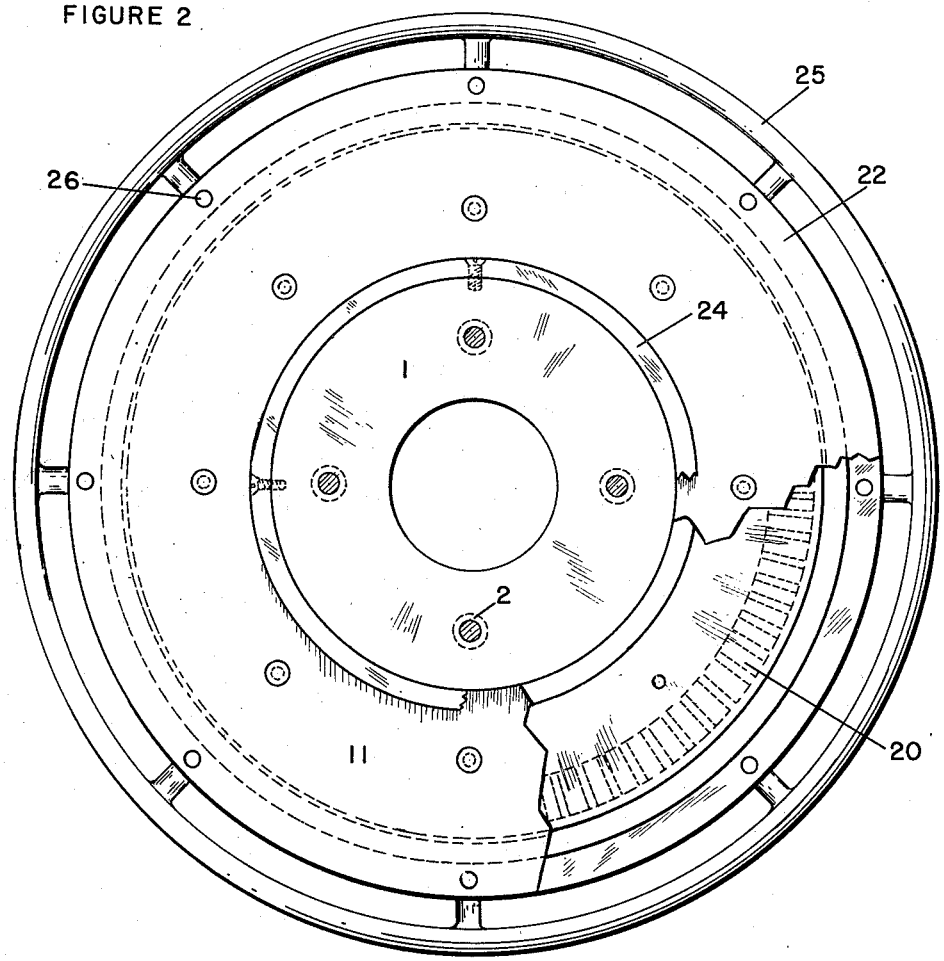
Figure 2 is a rear face view or elevation of the dog, as at line 2—2 of Fig. 1, partly broken away for convenience of illustration.

In order that the utility of the appliance in relation to a rotary lathe may readily be understood I have shown a portion of a standard lathe center including a tubular spindle S and centering pin P, and the circular face plate F, together with the work to be turned as W, all mounted to revolve or rotate in conventional manner, and with the work W properly centered.

The usual face plate F is drilled to receive bolts by means of which dogs of different sizes may be attached, and the mechanical structures involving the dog are mounted as a gripping unit upon the face plate.

The dog is attached to the face plate through the medium of a circular open center base-plate or body 1, which is rigidly fixed on the outer face of the face-plate F by means of stud bolts or Allen screws 2 threaded into the face of the face-plate.

The annular base-plate, which is arranged concentrically of the face-plate F, is fashioned with a number of integral housings or gear boxes 3 and 4, the outer open ends of which are closed by cover plates 5, fastened by screws or bolts.

These housings form gear boxes that are provided with required openings in their walls to accommodate operating parts of dog, and the number of housings varies with the number of work holding clamps of the dog, two of which are illustrated herein.

The housings or gear boxes provide the supports for two diametrically arranged work gripping jaws 6 and 7 of identical structure, each having an inner concave or angular gripping face for contact with the cylindrical work W, and the jaws are adapted for radial adjustment toward the axial center of the lathe to grip the work, as well as for radial retracting movement to release the work from the dog after completion of a turning operation.

Figure 5:
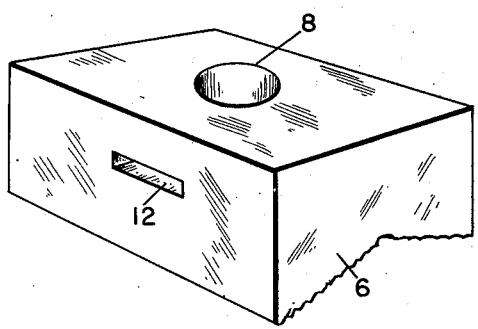
Figure 5 is a detail perspective view of one of the work-clamping jaws.
Figure 6:
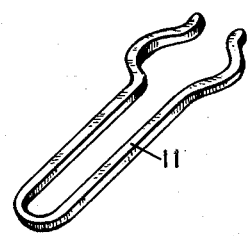
Figure 6 is a perspective view of one of the quick detachable spring detents employed in retaining a work clamping jaw on its bolt.

As indicated especially in Fig. 5 each jaw is fashioned with a round socket 8 opening through its inner face and bottomed with a square recess 8', to receive a reciprocably mounted, rotary, screw bolt 9, that is provided at its inner end with an annular exterior groove 10 and a squared portion 10'. The recess 8' receives the portion 10' and thereby locks the screw bolt 9 against rotation.

The jaws are retained on their bolts, by means of U-shaped spring detents 11, the two arms of which are compressed for insertion through a slot 12 in one side of a jaw. After being guided through slot 12 the arms of the spring detent embrace the grooved bolt, and then spread, slightly into an enlarged interior annular slot 13 of the socket 8, thus locking the bolt 9 against longitudinal displacement from the jaw, causing the jaw 6 to be projected or retracted with its respective bolt 9.

The jaws may quickly be detached from the bolts for substitution or replacements by first withdrawing the spring detents from the grooved bolts and the jaws.

Figure 3:
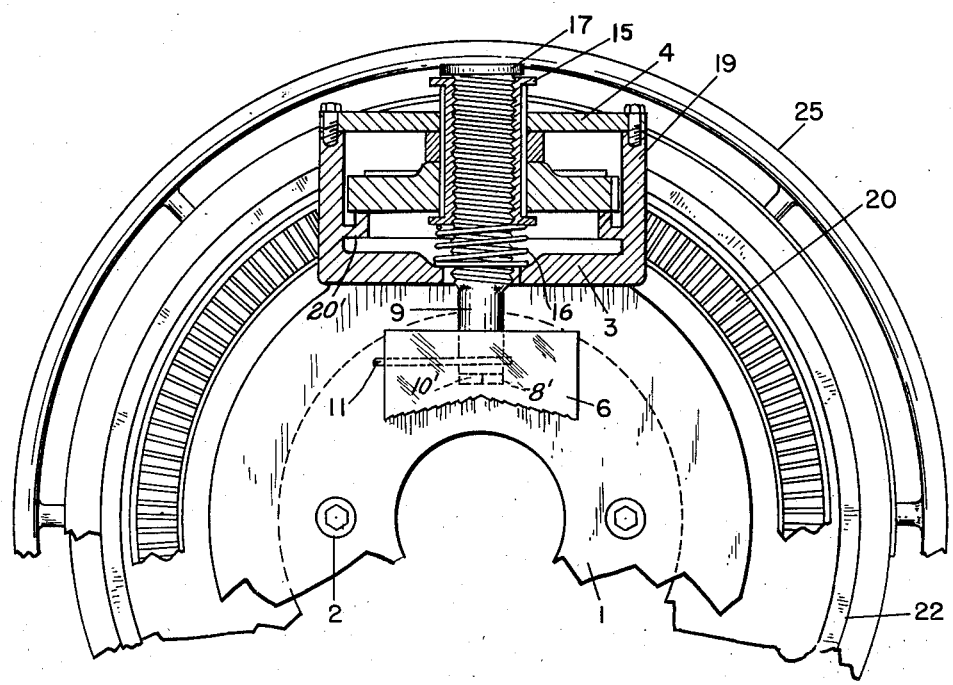
Figure 3 is a fragmentary view, with some parts in section, as at line 3—3 of Fig 1.
Figure 4:
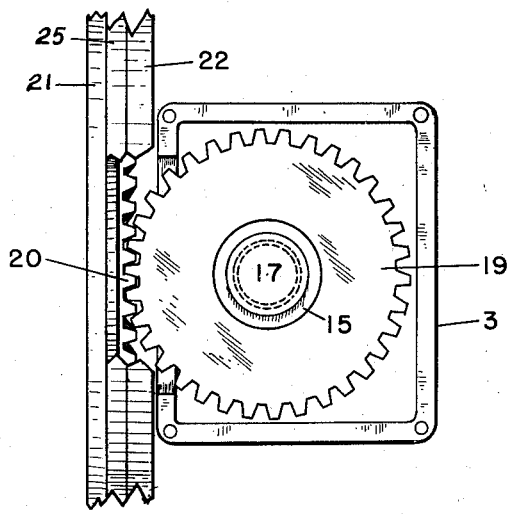
Figure 4 is a detached detail view showing the relation between the gear ring of the hand wheel and one of the gear wheels utilized in reciprocating one of the jaw bolts.

As best seen in Figs. 1 and 3, each of the bolts 9, 9, extends radially through an aperture 14 in the inner wall of the housing and it also projects through an alined hole in the removable cover plate 5 of the housing, the bolt being externally threaded for a major portion of its length where it passes through the housing or gear box.

Each externally threaded bolt is threaded within an internally threaded bushing or flanged sleeve 15 slidably mounted within the gear box cover 5, and an equalizing spring 16 is coiled about the bolt 9 and interposed between an exterior end flange of the bushing 15 and an inner seat of a wall of the housing 3. The spring 16 of each bolt 9 provides a self-centering means for the work clamping jaws by retaining the same from dropping toward the work W.

The bushing performs the functions of a traveling, rotary, nut for projecting and retracting the reciprocable bolt 9, and the bushing 15 is retained in operative position by co-action of its upper end flange with an enlarged head 17 of the screw bolt, which parts are located exterior of the housing.

The exterior cylindrical surface of the bushing 15 is splined as at 18 for slidable engagement with the splined hub of a gear wheel or pinion 19 that is thus caused to turn with the bushing, and a bearing washer or collar 20 is interposed between the cover plate 5 of the housing and the hub of the pinion or gear. An annular bearing support 20' assists collar 20 to retain the gear 19 in operative position.

By this arrangement of parts it will be apparent that the rotation of the pinion or gear wheel 19 carries with it the bushing 15, which performs the functions of a nut to reciprocate the threaded bolt 9, for the purpose of adjusting its jaw 6 toward and from its work.

Each of the screw bolts is provided with a bushing and gear wheel and the two gear wheels are turned in the same directions through the instrumentality of a single gear ring 20 that is mounted concentrically of the axis of the lathe, and rigid with a hand wheel that includes an annular bearing plate 21, flanged near its outer periphery at 22 to provide an annular cover for the gearing, and also flanged at its inner periphery to provide a bearing 23 journaled on the circular base plate 1; an annular collar 24 being fixed to the circular base plate between the face plate F and the bearing plate 21.

To complete the hand wheel an exterior spoked ring 25 is bolted at 26 to the plate 21, which ring projects beyond the periphery of the face plate F, and the housings where it is readily accessible for turning the hand wheel to operate the work clamping jaws.

Rotation of gear ring 20 rotates sleeve 15 to force bolt 9 and its jaw 6, towards the work W to grip the same. Upon reverse rotation, the jaws 6 are separated from the work W, permitting its removal, and the springs 16 assist in the jaw separation by forcing sleeve 15 axially of pinion 19. Even though the turning force is removed from ring 25, the spring 16 by acting upward on sleeve 15 retains the bolt 9 from dropping down towards the center.

Various changes and alterations may be made in the disclosure of my invention, within the scope of my appended claim.

Having thus fully described my invention, what I claim as new and desire to secure by Letters Patent is:

In a lathe dog the combination of a face plate adapted to be attached to a lathe spindle, a base plate secured to said face plate and having an annular bearing portion, a plurality of gear housings circumferentially spaced on said base plate, a flanged sleeve rotatably and axially slidably supported by each said gear housing, internal threads in said sleeve, a screw bolt extending radially of said base plate and in said sleeve threadedly engaging said internal threads, a gripping jaw anchored on an end of said screw bolt and movable therewith, external splines extending axially on said sleeve, a pinion in each said gear housing and slidably mounted on each said sleeve, said pinion having grooves slidably receiving said external splines, means in each said gear housing forming a bearing support for each said pinion for rotatably supporting the same for movement in a fixed plane, a compression spring about said screw bolt, the ends of said spring engaging said sleeve and said gear housing, respectively, biasing said sleeve axially of said gear housing, a manually-operated ring portion rotatably journaled on said bearing portion between said face plate and said gear housings, and a ring gear on said ring portion facing said housings and meshing with said pinions whereby the latter are rotated by said ring gear for reciprocating said screw bolts to radially adjust said jaws relative to said face plate.

JOHN M. ROLLAND.

REFERENCES CITED

The following references are of record in the file of this patent:

UNITED STATES PATENTS

| Number | Name | Date |
|---|---|---|
| 403,589 | Higgins | May 21, 1889 |
| 919,536 | Carter | Apr. 27, 1909 |
| 1,445,818 | Barker | Feb. 20, 1923 |